United States Patent
Oh et al.

(10) Patent No.: US 11,988,443 B2
(45) Date of Patent: May 21, 2024

(54) ELECTRONIC DEVICE AND CONTROL METHOD THEREFOR

(71) Applicant: Samsung Electronics Co., Ltd., Suwon-si (KR)

(72) Inventors: Youngjae Oh, Suwon-si (KR); Taehan Jeon, Suwon-si (KR); Jaehyun Park, Suwon-si (KR); Minjae Kim, Suwon-si (KR); Boah Kim, Suwon-si (KR); Hyunwoo Kim, Suwon-si (KR); Jangpyo Park, Suwon-si (KR); Changwon Son, Suwon-si (KR); Dongeui Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 17/299,151

(22) PCT Filed: Oct. 23, 2019

(86) PCT No.: PCT/KR2019/013977
§ 371 (c)(1),
(2) Date: Jun. 2, 2021

(87) PCT Pub. No.: WO2020/141700
PCT Pub. Date: Jul. 9, 2020

(65) Prior Publication Data
US 2022/0049895 A1    Feb. 17, 2022

(30) Foreign Application Priority Data

Dec. 31, 2018 (KR) .................. 10-2018-0174205

(51) Int. Cl.
*F25D 29/00* (2006.01)
*F25D 23/02* (2006.01)
(Continued)

(52) U.S. Cl.
CPC ......... *F25D 29/005* (2013.01); *F25D 23/028* (2013.01); *G01K 13/00* (2013.01);
(Continued)

(58) Field of Classification Search
CPC .... F25D 29/005; F25D 29/008; F25D 23/028; F25D 2700/02; F25D 2700/06;
(Continued)

(56) References Cited

U.S. PATENT DOCUMENTS 4,387,578 A * 6/1983 Paddock ................. F25D 29/00
236/94
4,604,871 A * 8/1986 Chiu ..................... F25D 29/008
62/130
(Continued)

FOREIGN PATENT DOCUMENTS

JP    2002-162149 A    6/2002
KR    10-0130056 B1    4/1998
(Continued)

OTHER PUBLICATIONS

TESTO316-3—Find any leak reliably (Retrieved on Sep. 2018), Electronic leakage detector for refrigerants.
(Continued)

*Primary Examiner* — Travis Ruby
(74) *Attorney, Agent, or Firm* — Jefferson IP Law, LLP

(57) ABSTRACT

An electronic device is disclosed. The electronic device of the present invention comprises a communication unit and a processor for receiving information on a refrigerator from the refrigerator through the communication unit, dividing an operation section of the refrigerator into an event section and a normal section on the basis of the received information, and determining whether the refrigerator is abnormal on the basis of a state of the refrigerator in the normal section or the event section among the received information. The event
(Continued)

section includes a section from a time point when a door of the refrigerator is opened to a time point when the temperature of the refrigerator reaches a predetermined temperature after the door is closed, and the normal section includes a section from a time point when the temperature of the refrigerator reaches the predetermined temperature to a time point before the door is opened.

18 Claims, 10 Drawing Sheets

(51) Int. Cl.
  *G01K 13/00* (2021.01)
  *G05D 23/19* (2006.01)
(52) U.S. Cl.
  CPC ..... *G05D 23/1902* (2013.01); *F25D 2700/02* (2013.01); *F25D 2700/12* (2013.01)
(58) Field of Classification Search
  CPC ............ F25D 2700/12; F25D 2700/14; F25D 2600/00; F25D 2600/06; G01K 13/00; G05D 23/1902
  See application file for complete search history.

(56) References Cited

U.S. PATENT DOCUMENTS

| | | | | |
|---|---|---|---|---|
| 4,646,528 A * | 3/1987 | Marcade | ................ | F25D 29/00 236/94 |
| 5,398,251 A * | 3/1995 | Shim | ................ | G05B 19/0428 62/126 |
| 5,524,444 A * | 6/1996 | Gromala | ............ | G05D 23/1917 236/78 D |
| 6,034,607 A * | 3/2000 | Vidaillac | ................ | G01K 1/14 340/529 |
| 6,502,411 B2 | 1/2003 | Okamoto | | |
| 6,553,774 B1 * | 4/2003 | Ishio | ................ | F25B 49/005 62/126 |
| 9,441,991 B2 | 9/2016 | Haga et al. | | |
| 9,752,810 B1 * | 9/2017 | Jacobson | ............. | F25D 29/006 |
| 10,371,568 B2 | 8/2019 | Shin et al. | | |
| 2005/0062600 A1 * | 3/2005 | Olsen | ................ | G05D 23/1902 340/506 |
| 2005/0103029 A1 | 5/2005 | Kawahara et al. | | |
| 2015/0150088 A1 * | 5/2015 | Haga | ................ | H04L 63/08 726/3 |
| 2016/0327921 A1 * | 11/2016 | Ribbich | ................ | F24F 11/30 |
| 2018/0062877 A1 * | 3/2018 | Iyengar | ................ | F25D 29/008 |
| 2019/0297401 A1 | 9/2019 | Kim et al. | | |

FOREIGN PATENT DOCUMENTS

| | | |
|---|---|---|
| KR | 10-0325549 B1 | 3/2002 |
| KR | 10-0406094 B1 | 11/2003 |
| KR | 10-1295989 B1 | 8/2013 |
| KR | 10-2014-0019594 A | 2/2014 |
| KR | 10-1803627 B1 | 11/2017 |
| KR | 10-1813593 B1 | 1/2018 |
| KR | 10-2018-0071932 A | 6/2018 |
| KR | 10-1892014 B1 | 8/2018 |
| WO | 2014/171119 A1 | 10/2014 |

OTHER PUBLICATIONS

Korean Office Action dated May 23, 2023, issued in Korean Patent Application No. 10-2018-0174205.

Korean Office Action dated Oct. 16, 2023, issued in Korean Patent Application No. 10-2018-0174205.

* cited by examiner

1000

(a)

(b)

ELECTRONIC DEVICE AND CONTROL METHOD THEREFOR

TECHNICAL FIELD

The disclosure relates to an electronic device and a method for controlling the same, and more particularly, to an electronic device communicating with a refrigerator and a method for controlling the same.

BACKGROUND ART

A refrigerator is an electronic device keeping foods refrigerated or frozen. The refrigerator may store not only foods, but also medicine, alcoholic liquor, or cosmetics in a storage.

A main function of the refrigerator is a temperature maintaining function for maintaining a constant state of products stored inside the storage by maintaining a constant temperature inside the storage.

Meanwhile, if abnormality occurs in the refrigerator, the refrigerator may not be operated normally and the temperature maintaining function which is the main function of the refrigerator may not be performed properly.

However, it is difficult to simply determine a reason for abnormality of the refrigerator only with the deterioration in temperature maintaining ability of the refrigerator. In particular, a refrigerator of the related art detected only obvious errors such as disconnection and current/voltage abnormality, and accordingly, with such single measurement element, it was difficult to accurately detect abnormality of the refrigerator at an early stage.

DISCLOSURE

Technical Problem

An object of the disclosure is to provide an electronic device for detecting an abnormality of a refrigerator at an early state and determining a reason for the abnormality and a method for controlling the same.

Technical Solution

In accordance with an embodiment of the disclosure, there is provided an electronic device including a communicator and a processor configured to receive information regarding a refrigerator from the refrigerator via the communicator, divide an operation section of the refrigerator into an event section and a normal section based on the received information, and determine whether the refrigerator is abnormal based on a state of the refrigerator in the normal section or the event section among the received information, in which the event section includes a section from a time point when a door of the refrigerator is opened until a time point when a temperature of the refrigerator reaches a predetermined temperature after the door is closed, and the normal section includes a section from a time point when the temperature of the refrigerator reaches the predetermined temperature until a time point before the door is opened.

The processor may be configured to determine whether the refrigerator is abnormal by comparing an internal temperature of the refrigerator in the normal section with a predetermined temperature threshold value.

The processor may be configured to, based on the internal temperature of the refrigerator in the normal section being higher than the predetermined temperature threshold value, determine that the refrigerator is abnormal.

The processor may be configured to adjust the predetermined temperature threshold value based on an external temperature of the refrigerator among the received information, and determine whether the refrigerator is abnormal by comparing the internal temperature of the refrigerator in the normal section with the adjusted temperature threshold value.

The processor may be configured to, based on a surrounding temperature of the refrigerator being higher than a predetermined temperature, adjust the predetermined temperature threshold value to be increased.

The processor may be configured to determine a decreasing speed of an internal temperature of the refrigerator from a time point when the door of the refrigerator is opened and then closed until a time point when internal temperature of the refrigerator reaches the predetermined temperature in the event section based on the received information, and determine whether the refrigerator is abnormal by comparing the decreasing speed with a predetermined speed threshold value.

The processor may be configured to, based on the decreasing speed being lower than the predetermined speed threshold value, determine that the refrigerator is abnormal.

The processor may be configured to determine an amount of products input to the refrigerator after the door is opened in the event section based on the received information, adjust the predetermined speed threshold value based on the amount of products input to the refrigerator, and determine whether the refrigerator is abnormal by comparing the decreasing speed with the adjusted speed threshold value.

The processor may be configured to, based on the amount of products input to the refrigerator being greater than a predetermined amount, adjust the predetermined speed threshold value to be decreased.

The processor may be configured to, based on the refrigerator being determined as being abnormal, receive additional information regarding the refrigerator from the refrigerator and other electronic devices around the refrigerator via the communicator, determine a reason for abnormality of the refrigerator based on the received additional information, and provide information regarding the determined reason.

In accordance with another aspect of the disclosure, there is provided a method for controlling an electronic device, the method including receiving information regarding a refrigerator from the refrigerator, dividing an operation section of the refrigerator into an event section and a normal section based on the received information, and determining whether the refrigerator is abnormal based on a state of the refrigerator in the normal section or the event section among the received information.

The event section may include a section from a time point when a door of the refrigerator is opened until a time point when a temperature of the refrigerator reaches a predetermined temperature after the door is closed, and the normal section may include a section from a time point when the temperature of the refrigerator reaches the predetermined temperature until a time point before the door is opened.

The determining whether the refrigerator is abnormal may include determining whether the refrigerator is abnormal by comparing an internal temperature of the refrigerator in the normal section with a predetermined temperature threshold value.

The determining whether the refrigerator is abnormal may include, based on the internal temperature of the refrigerator in the normal section being higher than the predetermined temperature threshold value, determining that the refrigerator is abnormal.

The determining whether the refrigerator is abnormal may include adjusting the predetermined temperature threshold value based on an external temperature of the refrigerator among the received information, and determining whether the refrigerator is abnormal by comparing the internal temperature of the refrigerator in the normal section with the adjusted temperature threshold value.

The adjusting may include, based on a surrounding temperature of the refrigerator being higher than a predetermined temperature, adjusting the predetermined temperature threshold value to be increased.

The determining whether the refrigerator is abnormal may include determining a decreasing speed of an internal temperature of the refrigerator from a time point when the door of the refrigerator is opened and then closed until a time point when internal temperature of the refrigerator reaches the predetermined temperature in the event section based on the received information, and determining whether the refrigerator is abnormal by comparing the decreasing speed with a predetermined speed threshold value.

The determining whether the refrigerator is abnormal may include, based on the decreasing speed being lower than the predetermined speed threshold value, determining that the refrigerator is abnormal.

The determining whether the refrigerator is abnormal may include determining an amount of products input to the refrigerator after the door is opened in the event section based on the received information, adjusting the predetermined speed threshold value based on the amount of products input to the refrigerator, and determining whether the refrigerator is abnormal by comparing the decreasing speed with the adjusted speed threshold value.

The adjusting may include, based on the amount of products input to the refrigerator being greater than a predetermined amount, adjusting the predetermined speed threshold value to be decreased.

The control method may further include, based on the refrigerator being determined as being abnormal, receiving additional information regarding the refrigerator from the refrigerator and other electronic devices around the refrigerator via the communicator, and determining a reason for abnormality of the refrigerator based on the received additional information, and providing information regarding the determined reason.

BEST MODE

Figure 1:
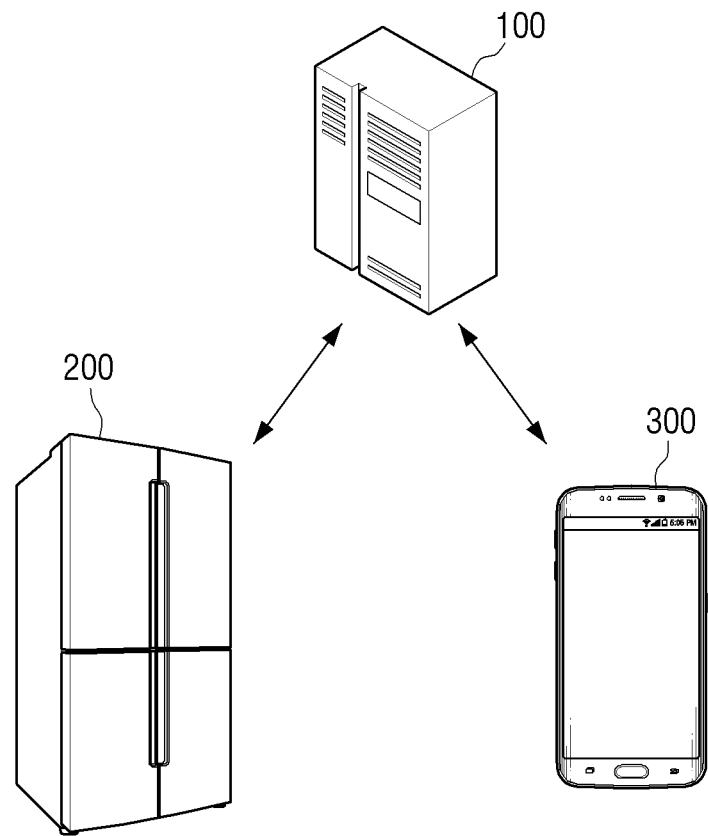
FIG. 1 is a diagram illustrating a system including an electronic device according to various embodiments.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements. For example, a first user device and a second user device may represent user devices different from each other, regardless of order and/or importance. For example, a first element may be referred to as a second element and the second element may also be similarly referred to as the first element, while not departing from the scope of a right of the disclosure.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

Hereinafter, with reference to the accompanying drawings, embodiments of the disclosure will be described in detail for those skilled in the art to easily practice the embodiments.

But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

The terms used in the description are used to describe an embodiment, but may not intend to limit the scope of other embodiments. Unless otherwise defined specifically, a singular expression may encompass a plural expression. The terms used herein including technical or scientific terms may refer to the same terms generally understood by those skilled in the art in the technical field of the disclosure. The terms defined in normal dictionaries among the terms used in the disclosure may be interpreted as the same or similar meanings in the related technologies and are not interpreted as ideal or excessively formal meanings. In some cases, the terms defined in the disclosure may not be interpreted to exclude the embodiments of the disclosure. The same reference numerals shown in the accompanying drawings denote members executing substantially the same function.

Hereinafter, various embodiments of the disclosure will be described in detail with reference to the drawings.

FIG. 1 is a diagram illustrating a system including an electronic device according to various embodiments.

Referring to FIG. 1, a system 1000 may include an electronic device 100, a refrigerator 200, and a user terminal device 300.

The electronic device 100 may receive information regarding the refrigerator 200 from the refrigerator 200. The electronic device 100 may determine whether the refrigerator 200 is abnormal by using the information regarding the refrigerator 200 received from the refrigerator 200. Herein, whether the refrigerator 200 is abnormal may indicate whether the refrigerator 200 is driven beyond a normal range, and the abnormality may refer to a state of breakdown/deterioration in performance of the refrigerator or a state with possibility of breakdown/deterioration in performance thereof.

Since the refrigerator 200 is a device for storing products including food ingredients refrigerated/frozen, the electronic device 100 may determine the refrigerator 200 is abnormal based on an internal temperature of the refrigerator 200 preferentially. The internal temperature herein may represent an internal temperature of a storage of the refrigerator 200 and may have an inclusive concept including not only the internal temperature but also a change of internal temperature.

If it is determined that the refrigerator 200 is abnormal, the electronic device 100 may additionally request information regarding the refrigerator to the refrigerator 200 or other electronic devices (not illustrated) around the refrigerator 200. The other electronic devices (not illustrated) around the refrigerator 200, which are electronic devices located around the refrigerator to detect a location of the refrigerator, an environment of the refrigerator such temperature/humidity of a space where the refrigerator is located, and the like, may be electronic devices forming a system of Internet of Things (IoT) together with the refrigerator 200 in a house.

The refrigerator 200, which has received the request regarding the additional information from the electronic device 100, may obtain information regarding internal/external environment of the refrigerator using various sensors included in the refrigerator 200 and transmit this to the electronic device 100.

In the same manner, the other electronic device (not illustrated), which has received the request regarding the information regarding the refrigerator 200 from the electronic device 100, may obtain information regarding the external environment of the refrigerator 200 using a camera, a microphone, a temperature or humidity measurement device included in the other electronic devices (not illustrated) and transmit this to the electronic device 100.

The electronic device 100 may determine a reason for abnormality of the refrigerator 200 using information additionally received from the refrigerator 200 or the other electronic devices (not illustrated) around the refrigerator 200.

In addition, the electronic device 100 may transmit the determined reason for abnormality of the refrigerator 200 to the refrigerator 200 or the user terminal device 300.

Accordingly, a user of the refrigerator 200 may grasp the abnormality of the refrigerator 200 and the reason for the abnormality at the early stage.

Meanwhile, the electronic device 100 in FIG. 1 may be a network device which is an external network such as a cloud server or a local network device such as a router, a home server, and the like. In addition, the electronic device 100 may be implemented as an embedded device mounted in a mobile phone, a refrigerator, or the like, rather than a separate independent device.

The refrigerator 200 may communicate with the electronic device 100 and transmit the information regarding the refrigerator 200 to the electronic device 100, and may also receive information regarding the reason for abnormality of the refrigerator 200 from the electronic device 100.

The refrigerator 200 may provide the information regarding the reason for abnormality received from the electronic device 100 to a user. For this, the refrigerator 200 of FIG. 1 may be a refrigerator including a speaker or a display.

However, this is merely an embodiment, and the refrigerator 200 may transfer the information regarding the reason for abnormality of the refrigerator 200 received from the electronic device 100 to the other electronic device (not illustrated) including a speaker or a display or the user terminal device 300, and the other electronic device (not illustrated) which has received the information regarding the reason for abnormality of the refrigerator 200 from the refrigerator 200 may provide this to the user.

The user terminal device 300 may also communicate with the electronic device 100 in wired and wireless manner to receive information regarding the refrigerator 200. Specifically, the user terminal device 300 may receive information regarding whether the refrigerator 200 is abnormal and the reason for abnormality from the electronic device 100 or the refrigerator 200.

FIG. 1 illustrates the user terminal device 300 as a smartphone, but there is no limitation thereto, and the user terminal device 300 may be various electronic devices such as a tablet PC, a PC, a laptop, a smart watch, a TV, a speaker, and the like.

Meanwhile, if the user terminal device 300 is a mobile terminal device, the electronic device 100, which has determined whether the refrigerator 200 is abnormal, may request the additional information regarding the refrigerator 200 to not only the refrigerator 200 or the surrounding device of the refrigerator 200, but also to the user terminal device 300.

In other words, the user terminal device 300 may also receive the request regarding the additional information regarding the refrigerator from the electronic device 100, and in this case, the user terminal device 300 may obtain additional information regarding the refrigerator using a camera, a microphone, and the like included in the user terminal device 300 and transmit this to the electronic device 100. The user terminal device 300 may be connected to a web server (not illustrated) online to obtain information such as the weather, humidity, and the like of a region where the refrigerator is located.

Meanwhile, this is merely an embodiment, and the user terminal device 300 may receive information regarding the reason for abnormality of the refrigerator 200 from the refrigerator 200. Specifically, the electronic device 100 may transmit the information regarding the reason for abnormality of the refrigerator 200 to the refrigerator 200 and the refrigerator 200 may transfer this to the user terminal device 300.

As described above, the electronic device 100 may periodically collect information related to the refrigerator 200 from the refrigerator 200 to determine whether the refrigerator 200 is abnormal, and receive the information regarding the refrigerator from the refrigerator 200 or the other external electronic device (not illustrated) to determine the reason for abnormality, and accordingly, the user may accurately recognize the abnormality of the refrigerator at the early stage.

Figure 2:
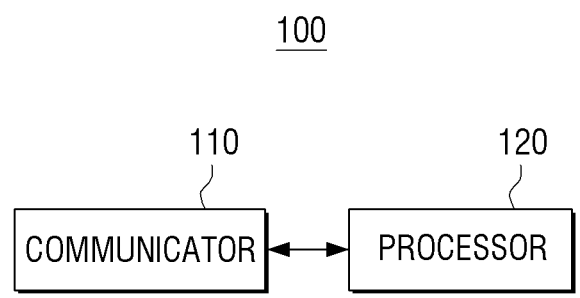
FIG. 2 is a block diagram illustrating a configuration of the electronic device according to various embodiments.

FIG. 2 is a block diagram illustrating a configuration of the electronic device according to various embodiments.

As illustrated in FIG. 2, the electronic device 100 may include a communicator 110 and a processor 120.

The communicator 110 may be an element for allowing communication of the electronic device 100 with the refrigerator 200, the other electronic device (not illustrated) around the refrigerator 200, and the user terminal device 300.

The communicator 110 may be connected to a network (not illustrated) by various types of communication methods to communicate with the other electronic device (not illustrated) via the network (not illustrated). For this, the communicator 110 may include wired Ethernet and a communication module for wireless LAN communication.

The communicator 110 may include various communication modules such as a wired communication module, a short-range wireless communication module (not illustrated), a wireless communication module (not illustrated), and the like. The short-range wireless communication module is a module for communicating with an external device in a short distance by a short-range wireless communication method such as Bluetooth (BT), Bluetooth low energy (BLE), and Zigbee. In addition, the wireless communication module may be a module connected to an external network for communication according to a wireless communication protocol such as Wi-Fi or IEEE. The wireless communication module may further include a mobile communication module connected to a mobile communication network for communication according to various mobile communication standards such as 3rd Generation (3G), 3rd Generation Partnership Project (3GPP), Long Term Evolution (LTE), LTE Advanced (LTE-A), 5G Networks, and the like, and may further include a mobile communication module which will be newly introduced according to the development of technologies.

The processor 120 performs a function of controlling general operations of the electronic device 100 and signal flows between internal constituent elements of the electronic device 100 and processing data.

Specifically, the processor 120 may control various hardware or software constituent elements included in the electronic device 100 and perform various data processing and operations. In addition, the processor 120 may load and process an instruction or data received from at least one of other constituent elements on a memory and store various pieces of data in a non-volatile memory. For this, the processor 120 may be implemented as a dedicated processor (e.g., an embedded processor) for performing the corresponding operations or a generic-purpose processor (e.g., a CPU or an application processor) capable of performing the corresponding operations by executing one or more software programs stored in a memory device.

The processor 120 may receive information regarding the refrigerator 200 from the refrigerator 200 via the communicator 110 and determine whether the refrigerator 200 is abnormal based on the received information regarding the refrigerator 200.

Specifically, the processor 120 may receive door opening information, temperature information, internal image information, refrigerator surrounding temperature/humidity information of the refrigerator 200 from the refrigerator 200 via the communicator 110.

The door opening information of the refrigerator 200 may refer to information regarding time when the door of the refrigerator 200 is opened and closed. The door opening information of the refrigerator 200 may be obtained by a door opening detection sensor, a lighting sensor, an internal camera in the refrigerator 200. The temperature information of the refrigerator 200 may refer to information regarding a temperature and a temperature change of the storage of the refrigerator 200 over time and a temperature sensor detecting the temperature inside the storage may detect the temperature change of the storage over time. Since the refrigerator 200 performs the refrigeration/freezing function, the temperature information of the refrigerator 200 may include temperature information of a refrigerator compartment and temperature information of a freezer compartment.

The internal image information of the refrigerator 200 may refer to an image of the inside of the storage of the refrigerator 200, and a camera for capturing an image of the inside of the storage may be provided on a side surface of the storage or an inner portion of the door of the refrigerator 200, in order to extract the image of the inside of the storage.

The surrounding temperature/humidity information of the refrigerator 200 may refer to temperature/humidity of a space where the refrigerator 200 is placed, and may be obtained by a temperature sensor or a humidity sensor for measuring external temperature/humidity of the refrigerator 200.

The refrigerator 200 may transmit the information regarding the refrigerator such as the door opening information, the temperature information, the internal image information, the refrigerator surrounding temperature/humidity information of the refrigerator 200 periodically to the electronic device 100, and the processor 120 may divide an operation section of the refrigerator into an event section and a normal section by using the received information regarding the refrigerator.

The processor 120 may determine whether the refrigerator is abnormal based on a state of the refrigerator in the normal section or the event section among the received information.

Figure 3:
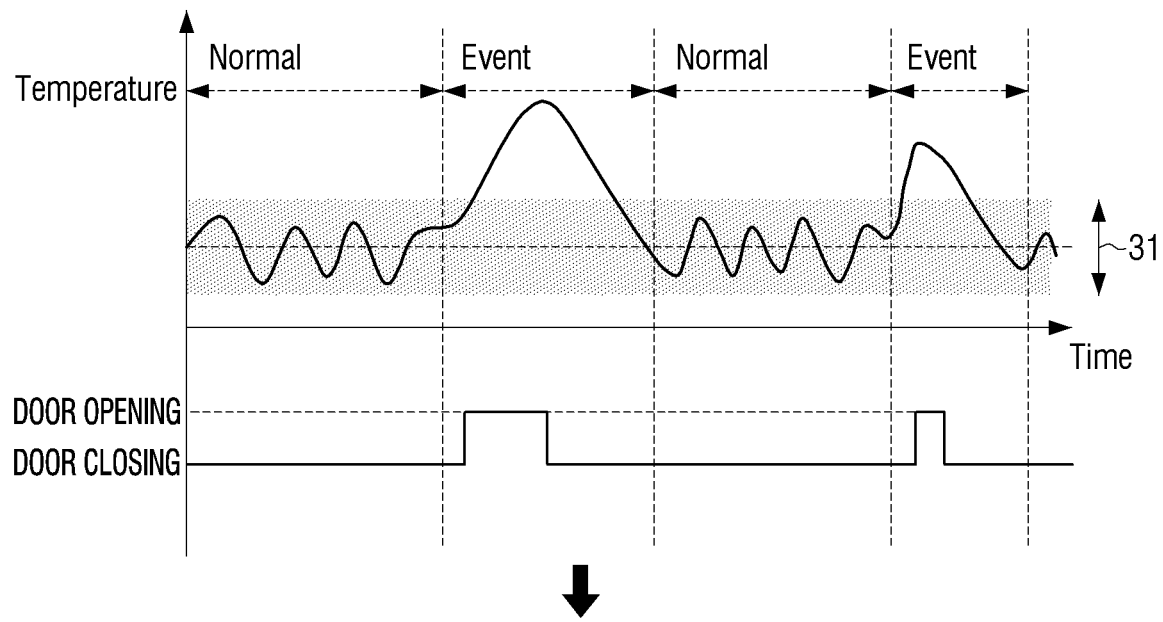
FIG. 3 is a diagram illustrating the electronic device according to an embodiment.
Figure 3:
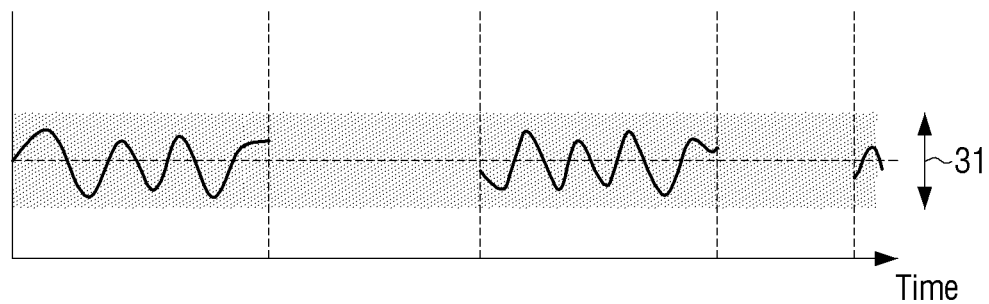
Figure 3:
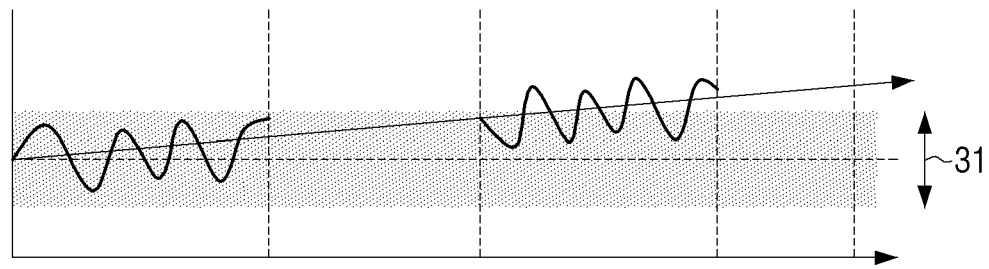

FIG. 3 is a diagram illustrating the electronic device dividing the event section and the normal section of the refrigerator 200 according to an embodiment.

In the disclosure, the event section of the refrigerator 200 indicates a section including an event of opening and closing of a door of the refrigerator 200, and specifically, a section from a time point when the door of the refrigerator 200 is opened until a time point when internal temperature of the refrigerator 200 reaches a predetermined temperature after the door is closed. The internal temperature herein may refer to a temperature of the storage of the refrigerator 200.

In addition, the normal section of the refrigerator 200 indicates a section excluding the event section from the operation section of the refrigerator 200, which is a section from the time point when the temperature of the refrigerator reaches the predetermined temperature after the door of the refrigerator is closed until a time point before the door is opened.

Referring to part (a) of FIG. 3, in the event section, after the door of the refrigerator 200 is opened, the external air or an external product having a temperature different from the temperature of the storage may enter the storage of the refrigerator 200, thereby increasing the internal temperature of the refrigerator 200. The internal temperature of the refrigerator 200 may increase until the door of the refrigerator 200 is closed, and the internal temperature of the refrigerator 200 may decrease after the door of the refrigerator 200 is closed.

Since the refrigerator 200 is an electronic device maintaining the temperature of the storage constantly, the refrigerator 200 may decrease the internal temperature of the refrigerator, which has increased in the event section, to a predetermined temperature.

On the other hand, in the normal section, since the door of the refrigerator is closed, the internal temperature of the refrigerator may be maintained in a predetermined normal range 31. Specifically, the refrigerator 200 may allow the internal temperature of the refrigerator to be maintained in the predetermined normal range 31 by turning on/off of a cooling function. The normal range 31 of the internal temperature may be different according to the refrigerator compartment and the freezer compartment of the refrigerator 200, but for convenience of description, the internal temperature normal range of each of the refrigerator compartment and the freezer compartment may be collectively referred to as the normal range of the internal temperature of the refrigerator 200.

As described above, since the operations of the refrigerator 200 in the event section and the normal section are different, the processor 120 may divide the operation section of the refrigerator 200 into the event section and the normal section, in order to more accurately determine whether the refrigerator 200 is abnormal.

Specifically, the processor 120 may distinguish the event section and the normal section by using the door opening information and the internal temperature information among the information received form the refrigerator 200 and the predetermined normal range 31 of the temperature of the refrigerator.

As described above, since a temperature increase due to the door opening and a temperature decrease due to the door closing occur in the event section, the processor 120 may determine the time point when the door is opened as a start of the event section, and determine the time point when the door is closed and the internal temperature reaches a predetermined value as an end of the event section, by using the door opening information and the internal temperature information.

By the same method, the processor 120 may determine the time point when the internal temperature of the refrigerator 200 reaches the predetermined value as a start of the normal section, and determine the time point when the door of the refrigerator 200 is opened as an end of the normal section.

In addition, the processor 120 may extract temperature information of the normal section and determine whether the refrigerator 200 is abnormal.

Specifically, referring to part (b) of FIG. 3, if the internal temperature of the refrigerator 200 in the normal section is in the predetermined normal range 31, the processor 120 may determine that the refrigerator 200 is normal. In other words, if the internal temperature of the refrigerator 200 is lower than a first predetermined temperature threshold value and higher than a second temperature threshold value, the processor 120 may determine that the refrigerator 200 is normal. The first temperature threshold value herein may indicate an upper limit of the predetermined normal range 31 of FIG. 3 and the second temperature threshold value may indicate a lower limit of the predetermined normal range 31.

Meanwhile, referring to part (c) of FIG. 3, if the internal temperature of the refrigerator 200 in the normal section exceeds the predetermined normal range 31, the processor 120 may determine that the refrigerator 200 is abnormal. In other words, if the internal temperature of the refrigerator 200 in the normal section is higher than the first temperature threshold value, the processor 120 may determine that the refrigerator is abnormal. On the other hand, if the internal temperature of the refrigerator 200 in the normal section is lower than the second temperature threshold value, the processor 120 may determine that the refrigerator is abnormal.

In still another embodiment, the processor may determine whether the refrigerator is abnormal based on the internal temperature change of the refrigerator 200 in the normal section.

As described above, the refrigerator 200 may allow the internal temperature of the refrigerator to be maintained in the predetermined normal range 31 by turning on/off of the cooling function. When the refrigerator 200 turns cooling function on, if the a speed of the internal temperature change of the refrigerator, that is, a cooling speed is lower than a predetermined value (cooling speed threshold value), the processor 120 may determine that the refrigerator 200 is abnormal.

Meanwhile, the internal temperature of the refrigerator 200 may vary depending on an external temperature of the refrigerator 200, that is, an indoor temperature of a space where the refrigerator 200 is located. For example, the internal temperature of the refrigerator 200 may be higher in winter, compared to summer. Accordingly, it is also necessary to determine the normal range 31 of the internal temperature of the refrigerator 200 differently depending on the external temperature of the refrigerator 200, and to adjust the temperature threshold value or the cooling speed threshold value for determining whether the refrigerator in the normal section is abnormal.

Figure 4:
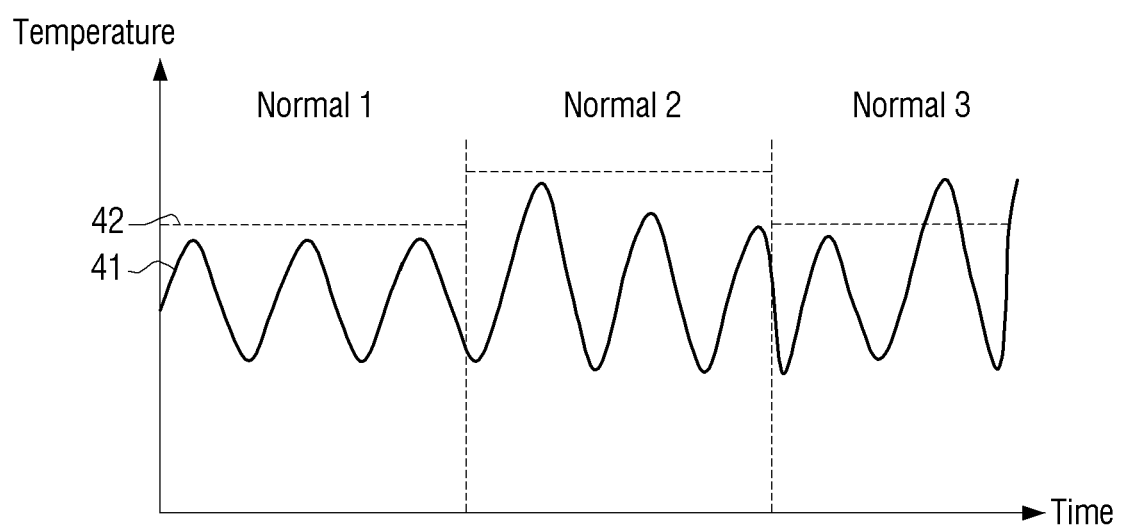
FIG. 4 is a diagram illustrating the electronic device according to an embodiment.

In relation thereto, FIG. 4 is a diagram illustrating the electronic device adjusting a threshold value for determining whether the refrigerator 200 is abnormal according to the external temperature of the refrigerator 200.

The processor 120 may adjust the temperature threshold value of the refrigerator 200 based on the external temperature of the refrigerator received from the refrigerator 200. The temperature threshold value of the refrigerator 200 herein is a predetermined threshold value, and the upper limit and the lower limit of the predetermined normal range 31 may be the first temperature threshold value and the second temperature threshold value, respectively, as described above with reference to FIG. 3.

Normal 1 of FIG. 4 represents a case where an internal temperature 41 of the refrigerator 200 is equal to or lower than a first temperature threshold value 42. In the case of Normal 1, since the internal temperature 41 of the refrigerator 200 is maintained to be equal to or lower than the first predetermined temperature threshold value 42, the processor 120 may determine that the driving state of the refrigerator 200 in Normal 1 is normal.

Normal 2 represents a case where the internal temperature 41 of the refrigerator 200 is increased due to an increase in external temperature of the refrigerator 200. In this case, the processor 120 may adjust the first temperature threshold value 42 of the refrigerator 200 in consideration of the external temperature of the refrigerator 200. In other words, in consideration of a change of the normal range of the internal temperature of the refrigerator 200 according to an increase in external temperature of the refrigerator 200, the processor 120 may adjust the first temperature threshold value of the refrigerator 200 to be increased.

Meanwhile, in a case of Normal 3, the external temperature of the refrigerator 200 is not increased compared to the case of Normal 1, and accordingly, the first temperature threshold value of the refrigerator 200 may have the same value as in Normal 1.

In other words, if the external temperature of the refrigerator is higher than a predetermined temperature, the processor 120 may adjust the first predetermined temperature threshold value to be increased.

Meanwhile, the processor 120 may store information regarding the normal range of the internal temperature or the temperature threshold value of the refrigerator according to the external temperature of the refrigerator 200 in a memory (not illustrated), in order to adjust the temperature threshold value according to the external temperature of the refrigerator 200.

Alternatively, the processor 120 may determine whether the refrigerator 200 is abnormal, by changing the normal range or the temperature threshold value of the refrigerator 200 according to a degree of the change in external temperature of the refrigerator 200. For example, it is assumed that, when the external temperature of the refrigerator 200 is 25° C., the first temperature threshold value of the refrigerator 200 is 8° C. In this case, if the external temperature of the refrigerator 200 increases by 40% from 25° C. to 35° C., the processor 120 may change the first temperature threshold value of the refrigerator 200 to 8.3° C. which is increased by 4% from 8° C.

The processor 120 may determine whether the refrigerator is abnormal by comparing the internal temperature of the refrigerator in the normal section with the adjusted first temperature threshold value.

In cases of Normal 1 and Normal 2, the processor 120 may determine that the refrigerator 200 is normal, since the internal temperature of the refrigerator is lower than the first temperature threshold value. In contrast, in a case of Normal 3, although the first temperature threshold value is the same as in case of Normal 1 because the external temperature of the refrigerator 200 is not increased, the internal temperature of the refrigerator 200 increases and exceeds the first temperature threshold value, and accordingly, the processor 120 may determine that the refrigerator 200 is abnormal.

Meanwhile, the processor 120 may determine whether the refrigerator 200 is abnormal by using information regarding the refrigerator 200 not only in the normal section but also in the event section.

Figure 5:
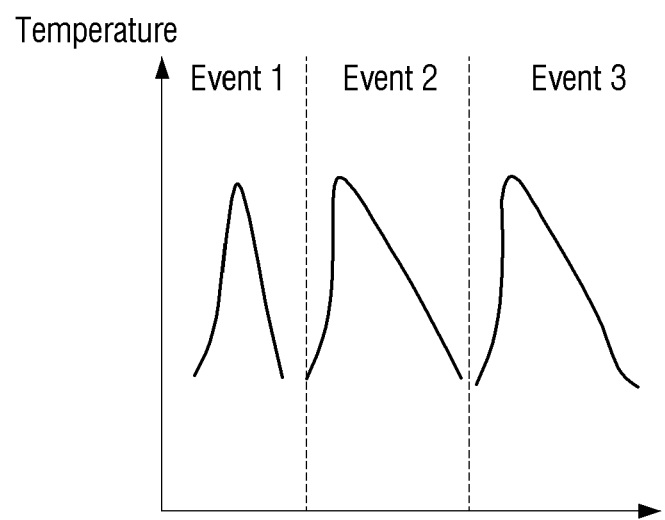
FIG. 5 is a diagram illustrating the electronic device according to an embodiment.
Figure 5:
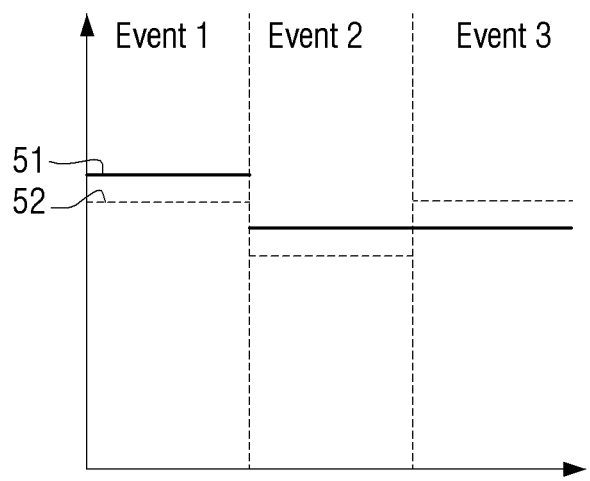

FIG. 5 is a diagram illustrating the electronic device determining whether the refrigerator 200 is abnormal by using the information regarding the refrigerator 200 in the event section.

As described above with reference to FIG. 3, in the event section, the internal temperature of the refrigerator 200 increases after the door of the refrigerator 200 is opened, and the internal temperature of the refrigerator 200 decreases to the predetermined temperature, when the door is closed, and accordingly, the processor 120 may determine whether the refrigerator 200 is abnormal based on a speed of the internal temperature reaching the predetermined temperature after the increase in the event section.

In other words, the processor 120 may determine a decreasing speed in the internal temperature of the refrigerator from the time point when the door of the refrigerator 200 is opened and closed until the time point when internal temperature of the refrigerator 200 reaches the predetermined temperature, and determine whether the refrigerator 200 is abnormal by comparing the corresponding speed with a predetermined speed threshold value. The predetermined speed threshold value represents a lower limit of a cooling speed range of the refrigerator 200 in a normal state, that is, a lower limit value of a temperature change over time from the time point when the door of the refrigerator 200 is opened and closed until the time point when internal temperature of the refrigerator reaches a predetermined temperature.

Specifically, a decreasing speed in internal temperature of the refrigerator 200 from the time point when the door of the refrigerator 200 is opened and closed is lower than the predetermined speed threshold value, the processor 120 may determine that the refrigerator 200 is abnormal.

Meanwhile, part (a) of FIG. 5 is a graph showing a change of the internal temperature over time in the event section, and graphs of Event 1 to Event 3 of part (a) of FIG. 5 may correspond to solid lines 51 of graphs of Event 1 to Event 3 of part (b) of FIG. 5, respectively.

In addition, dashed lines 52 of the graphs of Event 1 to Event 3 of part (b) of FIG. 5 may represent predetermined speed threshold values.

Event 1 of part (b) of FIG. 5 represents a case where the change of internal temperature of the refrigerator 200 is equal to or higher than the predetermined speed threshold value. In this case, since the change of the internal temperature of the refrigerator 200 is equal to or higher than the predetermined speed threshold value, the processor 120 may determine that the driving state of the refrigerator 200 in Event 1 is normal.

Event 2 of part (b) of FIG. 5 represents a case where there is an amount of products input from the outside after the door of the refrigerator 200 is opened. In this case, as the amount of the products input to the inside of the refrigerator 200 from the outside of the refrigerator 200 is large, the change of the temperature of the refrigerator 200 may be slow.

In this case, the slow change of the temperature of the refrigerator 200 is due to the products input from the outside and is not the occurrence of abnormality of the refrigerator 200 itself, and accordingly, the processor 120 may adjust the speed threshold value to determine the performance of the refrigerator 200.

Accordingly, the processor 120 may determine the amount of the products input to the refrigerator after the door is opened in the event section based on the information received from the refrigerator, and adjust the predetermined speed threshold value based on the amount of the products input to the refrigerator.

The processor 120 may determine the amount of the products input from the outside of the refrigerator using the refrigerator internal temperature information and the refrigerator internal image information among the information regarding the refrigerator received from the refrigerator 200, and adjust the speed threshold value of the event section accordingly. The processor 120 may determine the amount of products input from the outside using a pressure sensor provided on a shelf of the storage of the refrigerator.

In addition, since the external air flows into the refrigerator 200 depending on opening and closing of the door of the refrigerator 200, the processor 120 may adjust the speed threshold value of the event section according to the external temperature of the refrigerator 200. For example, if the external temperature of the refrigerator 200 is high as in summer, the processor 120 may adjust the speed threshold value of the event section to be decreased. On the other hand, if the external temperature of the refrigerator 200 is low as in winter, the processor 120 may adjust the speed threshold value of the event section to be increased.

If the amount of products input to the refrigerator 200 is greater than a predetermined amount, the processor 120 may adjust the predetermined speed threshold value to be decreased.

For example, if it is determined that the amount of a new product input from the outside of the refrigerator 120 is greater (e.g., 5 kg) than a predetermined amount (e.g., 1 kg), the processor 120 may decrease the speed threshold value of the refrigerator by approximately 0.3° C./min under the assumption that the temperature of the new product is the same as room temperature. However, this is merely an embodiment, and the amount of the products input and the decrease of the speed threshold value may be determined according to experiments and experiment values may be stored in advance in the memory (not illustrated) of the electronic device 100.

Meanwhile, Event 3 of part (b) of FIG. 5 is an example showing a case where the cooling speed of the refrigerator is slower than in Event 1, although there is no products input to the refrigerator after the door of the refrigerator 200 is opened. In this case, since there is no amount of the products input from the outside of the refrigerator, the processor 120 may set the speed threshold value to be the same as in the case of Event 1.

The processor 120 may determine whether the refrigerator is abnormal by comparing the internal temperature change speed of the refrigerator in the event section with the speed threshold value.

For example, in the case of Event 1 and Event 2, since the internal temperature change speed of the refrigerator is higher than the predetermined speed threshold value (case of Event 1) and the adjusted speed threshold value (case of Event 2), the processor 120 may determine that the refrigerator 200 is normal.

In contrast, in the case of Event 3, although the speed threshold value is the same as in Event 1 because the external product is not input to the refrigerator 200, the internal temperature change speed of the refrigerator 200 is decreased, and accordingly, the processor 120 may determine that the refrigerator 200 is abnormal.

Meanwhile, the embodiment of determining whether the refrigerator 200 is abnormal based on the internal temperature change speed of the refrigerator 200 in the event section is an embodiment of the disclosure, and in another embodiment, the processor 120 may determine whether the refrigerator 200 is abnormal based on the number of times of door opening and door opening time in the event section.

Specifically, the processor 120 may measure the number of times of the door opening (Open_count) and the door opening time (Open_time) in the event section of the refrigerator, and apply a first weight Wi and a second weight $W_2$ to the number of times of the door opening and the door opening time, respectively. If the internal temperature T of the refrigerator exceeds $\{(Open\_count)*(W_1)+(Open\_time)*(W_2)\}$ *T_threshold, the processor 120 may determine that the state of the refrigerator is abnormal, by using the number of times of the door opening (Open_count), the door opening time (Open_time), the first weight $W_1$ regarding the number of times of the door opening, and the second weight $W_2$ regarding the door opening time. Herein, T_threshold may be a constant regarding the internal temperature of the refrigerator which may be obtained experimentally. On the other hand, if the internal temperature T of the refrigerator is equal to or lower than $[\{(Open\_count)*(W_1)+(Open\_time)*(W_2)\}*T\_threshold]$, the processor 120 may determine that the state of the refrigerator is normal.

Meanwhile, in FIGS. 4 and 5, the abnormality of the refrigerator is determined based on the internal temperature of the refrigerator 200, but there is no limitation thereto, and the abnormality of the refrigerator may be determined by combining a plurality of elements.

For example, the processor 120 may determine whether the refrigerator is abnormal by using not only the internal temperature of the refrigerator 200, but in combination with sound information of the refrigerator 200, and in this case, the processor 120 may determine whether the refrigerator is abnormal by applying different weights to the internal temperature and sound of the refrigerator, respectively.

Meanwhile, if it is determined that the refrigerator 200 is abnormal, the processor 120 may determine a reason for abnormality of the refrigerator 200 by obtaining additional information regarding the refrigerator 200.

Figure 6:
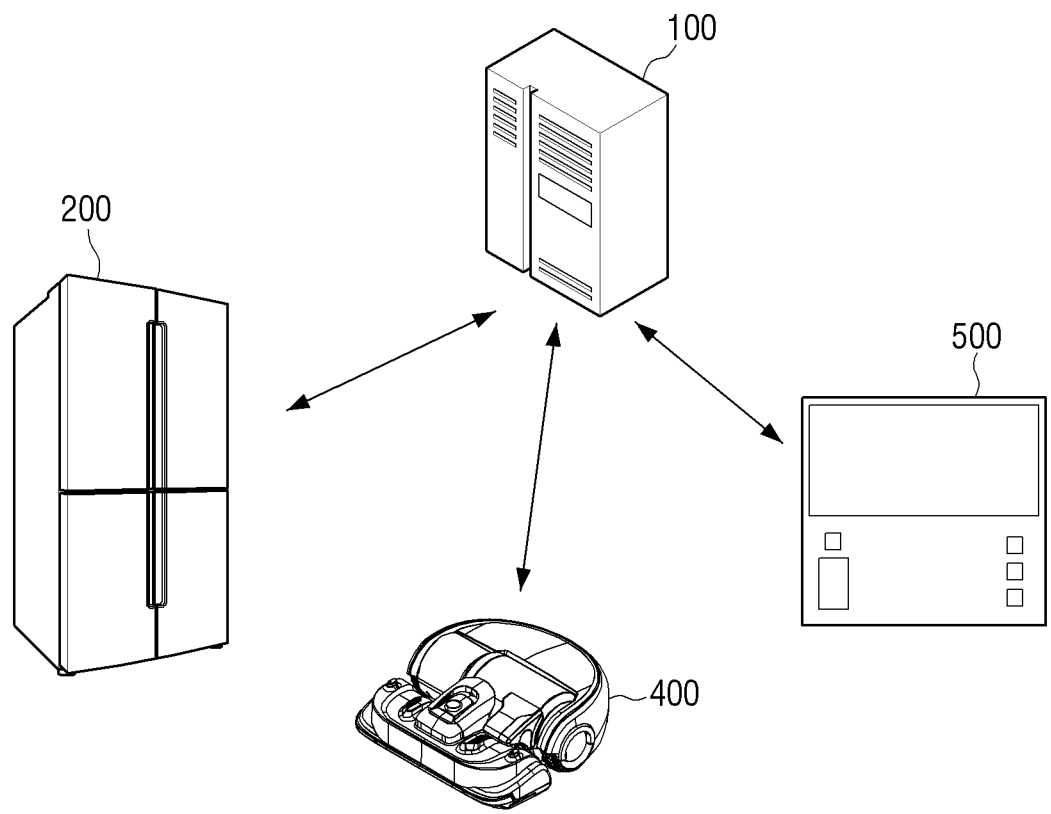
FIG. 6 is a diagram illustrating the electronic device which receives information from a refrigerator and other electronic devices around the refrigerator according to various embodiments.

In relation thereto, FIG. 6 is a diagram illustrating the electronic device which receives information from a refrigerator and other electronic devices around the refrigerator according to various embodiments.

As described above with reference to FIGS. 4 and 5, as a result of the determination by the processor 120 whether the refrigerator 200 is abnormal by adjusting the temperature threshold value or the speed threshold value in the event section or the normal section of the refrigerator 200, if it is determined that the refrigerator 200 is abnormal, the processor 120 may request the information regarding the refrigerator 200 to the refrigerator 200 or other electronic devices around the refrigerator 200 via the communicator 110, and receive additional information regarding the refrigerator 200 from the refrigerator 200 and the other electronic devices around the refrigerator 200.

Specifically, the processor 120 may request the sound information of the refrigerator 200 to the refrigerator 200. The sound information of the refrigerator 200 may represent a sound generated in the refrigerator 200 due to the driving of the refrigerator 200.

If the refrigerator 200 is normal, the sound information of the refrigerator 200 may include a temporary driving sound due to cooling function drive, a sound of intermittent flow of water/refrigerant, an operation preparation sound of water/ice dispenser, a temporary sound due to contraction/expansion of internal components of refrigerator compartment/freezer compartment, and the like.

Meanwhile, if the refrigerator 200 is abnormal, the sound information of the refrigerator 200 may include a sound due to accumulation of front/ice or foreign materials of a cooling unit, a sound of vibration due to compressor breakdown symptom and failure of refrigerator balance, and the like.

The refrigerator 200 which has received the request regarding the sound information of the refrigerator 200 from the electronic device 100 may collect sound data of the refrigerator 200 in a state with quire external environment (e.g. dawn).

However, this is merely an embodiment, and if the product is not included in a specific region among an accommodation region included in the storage, the refrigerator 200 may collect a sound generated from the refrigerator by using the corresponding specific region. For example, the refrigerator 200 may collect a sound generated by the refrigerator by repeating a load test of increasing and decreasing the temperature of the corresponding specific region.

The processor 120 may additionally request the internal image information of the refrigerator 200 to the refrigerator 200. For example, if it is determined that the refrigerator 200 is abnormal, the processor 120 may request an image obtained by more specifically capturing an image of the inside of the storage of the refrigerator 200.

In this case, the refrigerator 200 may transmit a state of a cold air discharge portion, a variable of surface such as frost or condensation, contamination or ice around the cooling unit, the amount of accumulation inside of the refrigerator 200, positions of products, and the like to the electronic device 100 using a camera and a pressure sensor in the refrigerator 200.

However, this is merely an embodiment, and the processor 120 may determine a reason for abnormality of the refrigerator by using the internal image of the refrigerator 200 received from the initial refrigerator 200, without requesting the additional information to the refrigerator 200.

Meanwhile, the electronic device 100 may request temperature/humidity information of the outside of the refrigerator to the refrigerator 200. In this case, if a temperature/humidity detection sensor is provided on the surface of the refrigerator 200, the refrigerator 200 may transmit the information regarding the temperature/humidity of the outside of the refrigerator to the electronic device 100.

The processor 120 may request the information regarding the refrigerator 200 to the other electronic devices around the refrigerator forming a system of IoT together with the refrigerator 200.

For example, referring to FIG. 6, the electronic device 100 may request an image of an external environment of the refrigerator 200 to a robot cleaner 400 including a camera. In this case, the robot cleaner 400 may capture an image of the surrounding environment of the refrigerator 200 while moving a surrounding area of the refrigerator 200 and transmit this to the electronic device 100.

The processor 120 may determine whether there is direct sunlight or a heating device such as a gas stove around the refrigerator 200, whether the refrigerator 200 maintains an appropriate interval from a wall, and whether the refrigerator is inclined, by using the image received from the robot cleaner 400.

In addition, the processor 120 may request the information regarding the external temperature/humidity of the refrigerator to an air conditioner system 500.

Meanwhile, FIG. 6 illustrates only the robot cleaner 400 and the air conditioner system 500 as the other electronic devices around the refrigerator, but this is merely an embodiment, and various other electronic devices around the refrigerator may be used.

The processor 120 may determine a reason for abnormality of the refrigerator based on the additional information received from the refrigerator 200 and the other electronic devices 400 and 500 around the refrigerator.

For example, the processor 120 may determine that there is high possibility that the cold air does not circulate properly, through the internal image of the refrigerator 200 received from the refrigerator 200, because the products of the refrigerator 200 cover the cold air discharge portion of the refrigerator.

In addition, the processor 120 may determine that there is possibility of refrigerant leakage, compressor breakdown, contamination around the cooling unit, and the like through the sound information of the refrigerator 200 received from the refrigerator 200.

In addition, the processor 120 may determine that the refrigerator needs to be disposed with an appropriate interval from the wall, the refrigerator is not level, or the like based on the information obtained from the other electronic devices 400 and 500 around the refrigerator 200.

Meanwhile, the processor 120 may sequentially determine the information received from the refrigerator 200 and the surrounding electronic devices of the refrigerator 200. For example, the processor 120 may determine reasons for abnormality of the refrigerator 200 by using the sound information, external environment information, and the internal environment information of the refrigerator in order. However, this is merely an embodiment, and there is no limitation thereto, and the processor 120 may determine reasons for abnormality of the refrigerator 200 at the same time in parallel by using the received information.

In order to determine the reasons for abnormality of the refrigerator 200, the electronic device 100 may store information that may be obtained using the refrigerator 200 and the electronic devices 400 and 500 around the refrigerator, reasons for breakdown/performance deterioration of the refrigerator 200, and the like in advance. For example, the memory (not illustrated) of the electronic device 100 may store data indicating that there is possibility of refrigerant leakage, compressor breakdown, attachment of frost or foreign materials to the cooling unit, and the like, in advance as reasons for abnormality in a case where the sound of the refrigerator 200 is abnormal.

In addition, the electronic device 100 may determine a reason for abnormality of the refrigerator and then provide information regarding the determined reason to the refrigerator 200 or the user terminal device 300.

Figure 8:
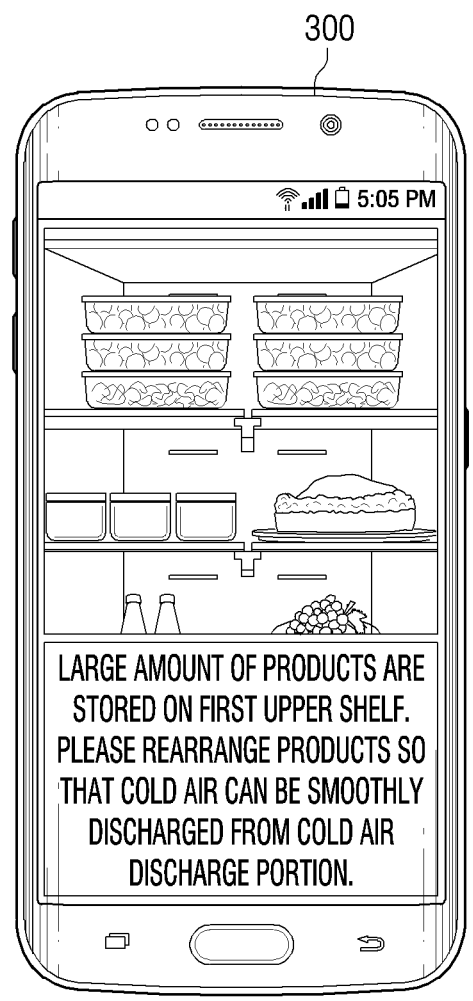
FIG. 8 is a block diagram illustrating a configuration of the refrigerator according to various embodiments.

In relation thereto, FIG. 8 is a diagram illustrating a screen of the user terminal device 300 which receives the information regarding the reason for abnormality from the electronic device 100.

The electronic device 100 which has determined the reason for abnormality of the refrigerator 200 may transmit the information regarding the reason for abnormality of the refrigerator 200 to the user terminal device 300. In addition, the user terminal device 300 may display the received information regarding the reason for abnormality of the refrigerator 200.

Specifically, the user terminal device 300 may display a message regarding the reason for abnormality of the refrigerator 200 together with the internal/external image of the refrigerator 200 and the internal image of the refrigerator 200 regarding the reason for abnormality of the refrigerator 200.

For example, referring to FIG. 8, the user terminal device 300 may provide a notification message representing that the cold air is not discharged from the cold air discharge portion because a large amount of products are stored on a first upper shelf of the refrigerator to a user, together with the internal image of the refrigerator 200.

Meanwhile, the content of the image and message displayed on the user terminal device 300 may vary depending on the reason for abnormality of the refrigerator 200.

FIG. 8 illustrates the user terminal device 300, but if the refrigerator 200 includes a display, the refrigerator 200 may display information regarding the reason for abnormality of the refrigerator received form the electronic device 100, as in the same manner as the user terminal device 300 of FIG. 8.

Figure 7:
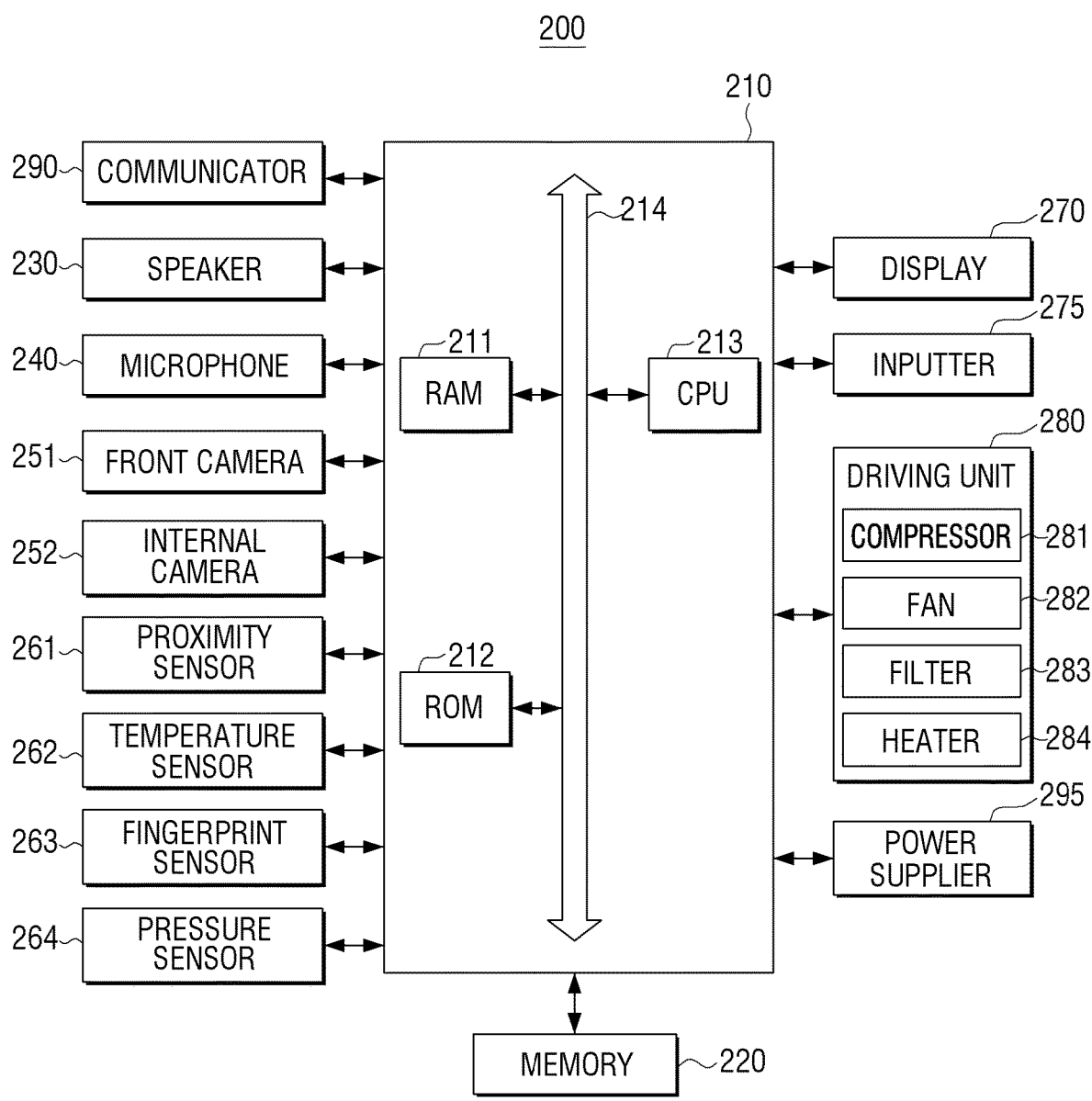
FIG. 7 is a diagram illustrating a user terminal device which receives a message from the electronic device.

FIG. 7 is a block diagram illustrating a configuration of the refrigerator according to various embodiments.

Referring to FIG. 7, the refrigerator 200 may include a processor 210, a memory 220, a speaker 230, a microphone 240, a front camera 251, an internal camera 252, a proximity sensor 261, a temperature sensor 262, a fingerprint sensor 263, a pressure sensor 264, a display 270, an inputter 275, a driving unit 280, a communicator 290, and a power supplier 295. Although not illustrated, according to embodiments, appropriate hardware and software elements apparent to those skilled in the art may be additionally included in the refrigerator 200. In addition, even the illustrated elements may be omitted from the refrigerator 200 according to an embodiment.

The processor 210 is a configuration for controlling general operations of the refrigerator 200. The processor 210 may control signal flows between internal constituent elements of the refrigerator 200 and perform a function of processing data. The processor 210, for example, may control a plurality of hardware or software constituent elements connected to the processor 210 by operating an operating system and applications, and perform various data processing and operations.

The processor 210 may include a RAM 211, a ROM 212, a CPU 213, and a bus 214. The RAM 211, the ROM 212, the CPU 213, and the like may be connected to each other via the bus 214.

The RAM 211 may be used as a storage region regarding various jobs performed in the refrigerator 200. The RAM 211 may be used as a storage region for the control information received from the outside, the operation information of the refrigerator 200, or the state information of the refrigerator 200. The ROM 212 may store a control program for controlling the refrigerator 200.

The processor 210 may be implemented as at least one general processor, a digital signal processor, an application specific integrated circuit (ASIC), a system on chip (SoC), a microcomputer (MICOM), and the like.

The processor 210 may control the communicator 290, the speaker 230, the microphone 240, the front camera 251, the internal camera 252, the proximity sensor 261, the temperature sensor 262, the fingerprint sensor 263, the pressure sensor 264, the display 270, the inputter 275, the driving unit 280, the memory 220, and the power supplier 295.

The refrigerator 200 may be connected to the electronic device and the other electronic devices around the refrigerator 200 via the communicator 290. The other electronic devices around the refrigerator 200 may be, for example, the user terminal device 300 and a home appliance (e.g., air conditioner, washing machine, or TV).

The communicator 290 may set a communication network by using a wired or wireless communication method. The refrigerator 200 may communicate with an external device via a mobile communication network, a wireless LAN communication network, or a short-range communication network. The wireless LAN communication may be connected to an access point (AP) in a wireless manner at a location where the AP is installed. Examples thereof may include a Wi-Fi communication. The short-range communication may include Bluetooth communication, Bluetooth low energy communication, Wi-Fi direct, infrared communication (infrared data association (IrDA)), ultra-wideband (UWB) communication, magnetic security transmission (MST) communication and/or near field communication (NFC), and the like.

The speaker 230 may output a sound corresponding to various signals (e.g., wireless signal, broadcast signal, audio source, video file, image capturing, or the like). The speaker 230 may be configured as one or a plurality of speakers.

The speaker 230 may be located on a front surface and/or side surface of the refrigerator 200 as one or a plurality of speakers. According to an embodiment, the speaker 230 may be disposed to be adjacent to the display 270.

According to an embodiment of the disclosure, the speaker 230 may output a hearing feedback regarding display of storage location of foods in the storage.

The microphone 240 may generate (or convert) a voice or a sound received from outside as an electric signal. The electric signal generated from the microphone 240 may be stored in the memory 220 or output via the speaker 230. The microphone 240 may be configured as one or a plurality of microphones.

The front camera 251 (or first camera) and the internal camera 252 (or second camera) may capture a still image or a video.

The front camera 251 may be disposed to capture an image of the front part of the refrigerator 200.

The internal camera 252 may be disposed to capture an image of at least one of storages. The internal camera 252 may be disposed at any location, as long as it is a location where an image of the inside of the storage may be captured while the door is closed. According to an embodiment, the internal camera 252 may be located at the back of the door as one or a plurality of cameras.

The internal camera 252 may be disposed on an inner wall of the storage.

The internal camera 252 may be a 3D camera capable of obtaining a depth map. Alternatively, a depth map may also be obtained through a stereo matching method using two internal cameras 252. The relative locations of the objects in the captured image may be identified through the depth map.

The processor 210 may store an image captured through one of the front camera 251 and the internal camera 252 in the memory 220.

The proximity sensor 261 is a sensor for detecting an object without contact and may be used for detecting whether an object is present close to the refrigerator 200.

The temperature sensor 262 may be used for detecting a temperature of the storage of the refrigerator 200.

The proximity sensor 261 may be located on the front surface of the door of the refrigerator 200. The temperature sensor 262 may be located in the storage.

The fingerprint sensor 263 may be used for recognizing a fingerprint of the user.

The pressure sensor 264 may be disposed on a shelf of the refrigerator and used for identifying a weight of an object placed on the shelf. The pressure sensor 264 may be used for determining an amount of products newly input to the refrigerator in the event section.

The pressure sensor 264 may be disposed on the shelf in an array form.

Specifically, the plurality of pressure sensors 264 may be disposed on the shelf of the refrigerator over the entire area of the shelf at regular intervals. The array interval of the pressure sensors 264 may be 1 mm or less. The processor 210 may identify a bottom surface shape and a weight of the food placed on the shelf based on the pressure detected by the pressure sensor 164. In particular, the processor 210 may identify which food is placed on which location based on the image captured by the internal camera 252 and the pressure detected by the pressure sensor 264.

In addition, the refrigerator 200 may include various sensors. For example, the refrigerator may further include a sensor for detecting door opening and closing of the refrigerator, an illuminance sensor for detecting an amount of light around the refrigerator 200 for adjusting brightness of the display 270, and the like.

The display 270 may display information regarding the reason for abnormality of the refrigerator 200 received from the electronic device 100.

The inputter 275 may receive a user input and transfer the user input to the processor 210. The inputter 275 may be, for example, at least one of a touch sensor, a (digital) pen sensor, a pressure sensor, a key, and the like. The touch sensor may use, for example, at least one type of an electrostatic type, a pressure-sensitive type, an infrared type, or an ultrasonic type. The (digital) pen sensor may be, for example, a part of a touch panel or may include a separate sheet for recognition. The key may include, for example, a physical button, an optical key, or a keypad.

The display 270 and the touch sensor of the inputter 275 may be implemented as a touch screen by forming a layered structure.

The driving unit 280 may include a compressor 281, a fan 282, a filter 283, or a heater 284 operated according to the control of the processor 210. The driving unit 280 may further include a light (not illustrated) or a deodorizer (not illustrated).

The compressor 281 may compress a refrigerant which is a working fluid of a cooling cycle by the control of the processor 210. The cooling cycle may include a condenser (not illustrated) for converting a refrigerant in a gaseous state compressed by the compressor 281 into a refrigerant in a liquid state, an expander (not illustrated) for reducing pressure of the refrigerant in the liquid state, and an evaporator (not illustrated) for evaporating the pressure-reduced refrigerant in the liquid state.

The fan 282 may circulate the external air by the control of the processor 210. The air heated by the cooling cycle may be subjected to heat exchange through external air to be cooled.

The filter 283 may sterilize (or remove) bacteria floating or attached inside the storage by the control of the processor 210. The filter 283 may include an ion sterilization and purifying unit.

The heater 284 may remove frost generated by the control of the processor 210. The heater 284 may include a defrost heater.

The power supplier 295 may supply a power to constituent elements of the refrigerator 200 by the control of the processor 210. The power supplier 295 may supply a power input from an external power source to each constituent element of the refrigerator 200 through a power code (not illustrated) by the control of the processor 210.

The memory 220 may store various pieces of data, control programs, or applications for driving and controlling the refrigerator 200. Specifically, the memory 220 may store data regarding the speed threshold value according to the temperature change speed in the event section, the temperature threshold value according to the external temperature in the normal section, and the like.

The memory 220 may include an internal memory or an external memory.

The internal memory may include, for example, at least one of a volatile memory (e.g., dynamic RAM (DRAM)), a static RAM (SRAM), or a synchronous dynamic RAM (SDRAM) or the like), a non-volatile memory (non-volatile Memory) (e.g., one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD).

The external memory may include a flash drive, for example, a compact flash (CF), a secure digital (SD), micro secure digital (Micro-SD), mini secure digital (Mini-SD), extreme digital (xD), multi-media card (MMC), or a memory stick. The external memory may be functionally and/or physically connected to the refrigerator 200 via various interfaces.

The memory 220 may be accessed by the processor 210 and reading, recording, editing, deleting, or updating of the data by the processor 210 may be executed. A term, memory, in the disclosure may include the memory 220, the ROM 212 and the RAM 211 in the processor 210, or a memory card (e.g., micro SD card or memory stick) mounted on the refrigerator 200.

The memory 220 may store computer executable instructions for performing the method for controlling the refrigerator described in the disclosure.

Figure 9:
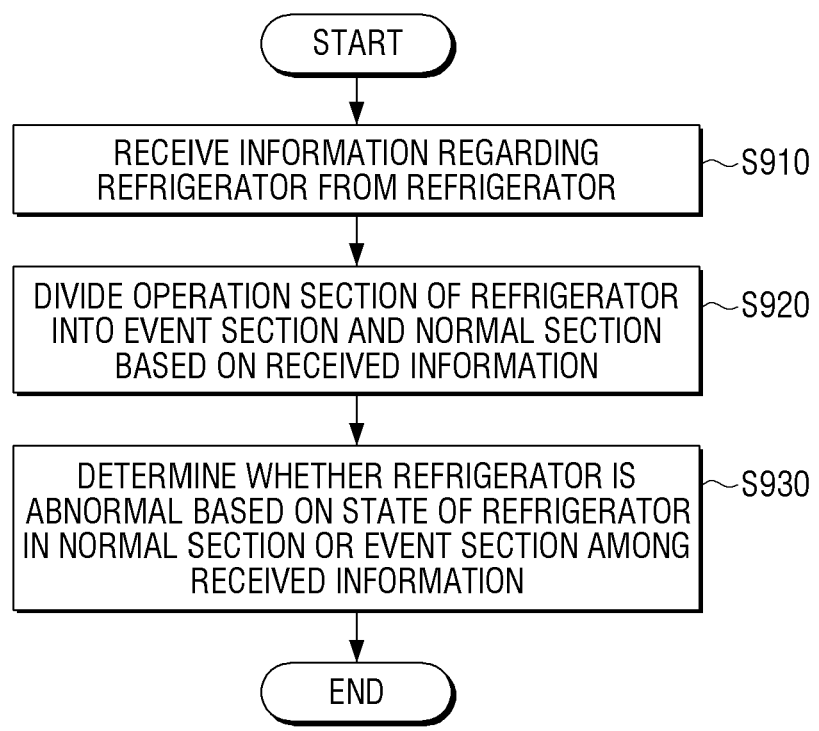
FIG. 9 is a flowchart illustrating a method for controlling the electronic device according to various embodiments.
Figure 10:
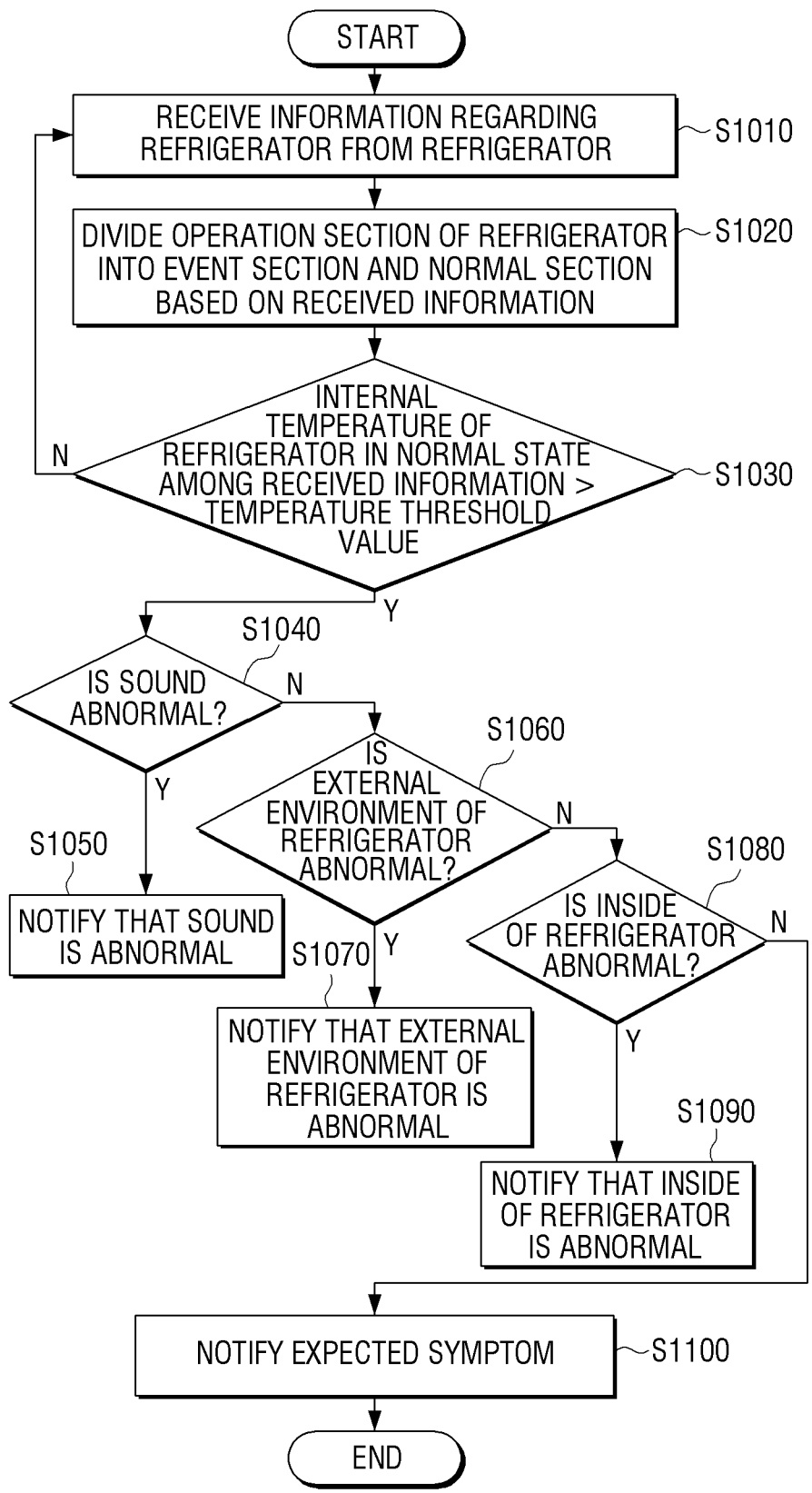
FIG. 10 is a flowchart illustrating a method for controlling the electronic device according to various embodiments.

FIGS. 9 and 10 are flowcharts illustrating a method for controlling the electronic device according to various embodiments.

First, the electronic device may receive information regarding the refrigerator from the refrigerator (S910). The information regarding the refrigerator may include door opening information, the internal temperature information, the internal image information, the external temperature/humidity information, and the like of the refrigerator.

The electronic device may divide the operation section of the refrigerator into the event section and the normal section based on the information received from the refrigerator (S920). Specifically, the electronic device may divide the operation section of the refrigerator into the event section and the normal section using the door opening information and the internal temperature information of the refrigerator.

Specifically, the electronic device may determine whether the refrigerator is abnormal based on the state of the refrigerator in the normal or event section (S930).

The electronic device may determine whether the refrigerator is abnormal by comparing the internal temperature of the refrigerator in the normal section with the predetermined temperature threshold value.

If the internal temperature of the refrigerator in the normal section is higher than the predetermined temperature threshold value, the electronic device may determine that the refrigerator is abnormal.

If it is determined that the refrigerator is abnormal, the electronic device may request the information regarding the refrigerator to the refrigerator and the other electronic devices around the refrigerator.

In relation thereto, FIG. 10 is a flowchart illustrating a method for requesting the information regarding the refrigerator to the refrigerator and the surrounding devices of the refrigerator by the electronic device.

The electronic device may receive the information regarding the refrigerator from the refrigerator (S1010).

The electronic device may divide the operation section of the refrigerator into the event section and the normal section based on the received information (S1020).

The electronic device may adjust the speed threshold value and the temperature threshold value for each of the event section and the normal section and determine whether the refrigerator is abnormal.

The electronic device may adjust the temperature threshold value based on the external temperature of the refrigerator. Specifically, if the temperature around the refrigerator is higher than the predetermined temperature, the electronic device may adjust the predetermined temperature threshold value to be increased.

The electronic device may determine whether the refrigerator is abnormal by comparing the internal temperature of the refrigerator in the normal section with the adjusted temperature threshold value.

If the internal temperature of the refrigerator in the normal state among the received information is higher than the temperature threshold value (S1030-Y), the electronic device may determine that the refrigerator is abnormal.

If it is determined that the refrigerator is abnormal, the electronic device may request the information regarding the refrigerator to the refrigerator and the electronic devices around the refrigerator and determine a reason for abnormality of the refrigerator. The information regarding the refrigerator may include sound information, external environment information, internal image information, and the like of the refrigerator.

The electronic device may determine whether the sound of the refrigerator is abnormal by using the received sound information of the refrigerator (S1040). If it is determined that the sound of the refrigerator is abnormal (S1040-Y), the electronic device may provide a notification message indicating that the sound is abnormal. Herein, the notification message may include information regarding a reason for abnormality of the sound (e.g., motor abnormality or compressor abnormality), in addition to the sound abnormality information.

Meanwhile, if the sound has no abnormality (S1040-N), the electronic device 100 may determine whether the external environment of the refrigerator is abnormal (S1060). If there is a problem in the external environment of the refrigerator, for example, the refrigerator is irradiated with direct sunlight or the refrigerator is closely attached to the wall (S1060-Y), the electronic device may notify that there is a reason for abnormality in the external environment of the refrigerator (S1070).

However, if the external environment of the refrigerator has no abnormality (S1060-N), the electronic device may determine whether the inside of the refrigerator is abnormal (S1080). The electronic device may determine the state of the cold air discharge portion, the amount of products, and the like in the refrigerator by using the internal image of the refrigerator received from the refrigerator. If it is determined that the inside of the refrigerator has no abnormality (S1080-Y), the electronic device may provide a notification indicting that the inside of the refrigerator is abnormal. On the other hand, if the inside of the refrigerator has no abnormality, the electronic device may notify a possibility of refrigerant leakage or the performance deterioration of cooling system and the like (S1100).

Meanwhile, the electronic device may examine the sound, the external environment, the internal environment, and the like of the refrigerator in sequence, in order to determine the reason for abnormality of the refrigerator, but there is no limitation in such order. In other words, the electronic device may examine the sound, the external environment, the internal environment, and the like of the refrigerator at the same time.

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device) according to the disclosed embodiments.

In a case where the instruction is executed by a processor, the processor may perform a function corresponding to the instruction directly or using other elements under the control of the processor.

The instruction may include a code made by a compiler or a code executable by an interpreter. For example, by executing the instruction stored in the storage medium, the method for controlling the electronic device described above may be performed. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a communicator; and
a processor configured to:
receive information regarding a refrigerator from the refrigerator via the communicator, divide an operation section of the refrigerator into an event section and a normal section based on the received information,
determine whether the refrigerator is abnormal based on a state of the refrigerator in the normal section or the event section among the received information,
determine a decreasing speed of an internal temperature of the refrigerator from a time point when a door of the refrigerator is opened and then closed until a time point when internal temperature of the refrigerator reaches a predetermined temperature in the event section based on the received information, and
determine whether the refrigerator is abnormal by comparing the speed with a predetermined speed threshold value,
wherein the event section comprises a section from a time point when the door of the refrigerator is opened until a time point when a temperature of the refrigerator reaches the predetermined temperature after the door is closed,
wherein the normal section comprises a section from a time point when the temperature of the refrigerator reaches the predetermined temperature until a time point before the door is opened, and
wherein the processor is further configured to:
measure a number of door opening and door opening times, and
determine whether the refrigerator is abnormal by comparing the internal temperature of the refrigerator with preset value (T_threshold) multiplied by a sum value, the sum value being an addition of the number of door openings to which a first weight is applied and the door opening time to which a second weight is applied.

2. The device according to claim 1, wherein the processor is further configured to determine whether the refrigerator is abnormal by comparing an internal temperature of the refrigerator in the normal section with a predetermined temperature threshold value.

3. The device according to claim 2, wherein the processor is further configured to, based on the internal temperature of the refrigerator in the normal section being higher than the predetermined temperature threshold value, determine that the refrigerator is abnormal.

4. The device according to claim 2, wherein the processor is further configured to:
adjust the predetermined temperature threshold value based on an external temperature of the refrigerator among the received information, and
determine whether the refrigerator is abnormal by comparing the internal temperature of the refrigerator in the normal section with the adjusted temperature threshold value.

5. The device according to claim 4, wherein the processor is further configured to, based on a surrounding temperature of the refrigerator being higher than a predetermined temperature, adjust the predetermined temperature threshold value to be increased.

6. The device according to claim 1, wherein the processor is further configured to, based on the decreasing speed being lower than the predetermined speed threshold value, determine that the refrigerator is abnormal.

7. The device according to claim 1, wherein the processor is further configured to:
determine an amount of products input to the refrigerator after the door is opened in the event section based on the received information, adjust the predetermined speed threshold value based on the amount of products input to the refrigerator, and
determine whether the refrigerator is abnormal by comparing the decreasing speed with the adjusted speed threshold value.

8. The device according to claim 7, wherein the processor is further configured to, based on the amount of products input to the refrigerator being greater than a predetermined amount, adjust the predetermined speed threshold value to be decreased.

9. The device according to claim 1, wherein the processor is further configured to: based on the refrigerator being determined as being abnormal, receive additional information regarding the refrigerator from the refrigerator and other electronic devices around the refrigerator via the communicator,
determine a reason for abnormality of the refrigerator based on the received additional information, and
provide information regarding the determined reason.

10. A method for controlling an electronic device, the method comprising:
receiving information regarding a refrigerator from the refrigerator;
dividing an operation section of the refrigerator into an event section and a normal section based on the received information;
determining whether the refrigerator is abnormal based on a state of the refrigerator in the normal section or the event section among the received information, determining a decreasing speed of an internal temperature of the refrigerator from a time point when a door of the refrigerator is opened and then closed until a time point when internal temperature of the refrigerator reaches a predetermined temperature in the event section based on the received information; and determining whether the refrigerator is abnormal by comparing the speed with a predetermined speed threshold value, wherein the event section comprises a section from a time point when the door of the refrigerator is opened until a time point when a temperature of the refrigerator reaches the predetermined temperature after the door is closed, wherein the normal section comprises a section from a time point when the temperature of the refrigerator reaches the predetermined temperature until a time point before the door is opened, and wherein the determining of whether the refrigerator is abnormal comprises:

measuring a number of door opening and door opening times; and determining whether the refrigerator is abnormal by comparing the internal temperature of the refrigerator with preset value (T_threshold) multiplied by a sum value, the sum value being an addition of the number of door openings to which a first weight is applied and the door opening time to which a second weight is applied.

11. The method according to claim 10, wherein the determining of whether the refrigerator is abnormal comprises determining whether the refrigerator is abnormal by comparing an internal temperature of the refrigerator in the normal section with a predetermined temperature threshold value.

12. The method according to claim 11, wherein the determining of whether the refrigerator is abnormal comprises, based on the internal temperature of the refrigerator in the normal section being higher than the predetermined temperature threshold value, determining that the refrigerator is abnormal.

13. The method according to claim 11, wherein the determining of whether the refrigerator is abnormal comprises:

adjusting the predetermined temperature threshold value based on an external temperature of the refrigerator among the received information; and determining whether the refrigerator is abnormal by comparing the internal temperature of the refrigerator in the normal section with the adjusted temperature threshold value.

14. The method according to claim 13, wherein the adjusting of the predetermined temperature threshold value comprises, based on a surrounding temperature of the refrigerator being higher than a predetermined temperature, adjusting the predetermined temperature threshold value to be increased.

15. The method according to claim 10, further comprising:

based on the decreasing speed being lower than the predetermined speed threshold value, determining that the refrigerator is abnormal.

16. The method according to claim 10, further comprising:

determining an amount of products input to the refrigerator after the door is opened in the event section based on the received information, adjust the predetermined speed threshold value based on the amount of products input to the refrigerator; and determining whether the refrigerator is abnormal by comparing the decreasing speed with the adjusted speed threshold value.

17. The method according to claim 16, further comprising:

based on the amount of products input to the refrigerator being greater than a predetermined amount, adjusting the predetermined speed threshold value to be decreased.

18. The method according to claim 10, further comprising:

based on the refrigerator being determined as being abnormal, receiving additional information regarding the refrigerator from the refrigerator and other electronic devices around the refrigerator via a communicator;

determining a reason for abnormality of the refrigerator based on the received additional information; and providing information regarding the determined reason.

* * * * *